Figure 3:
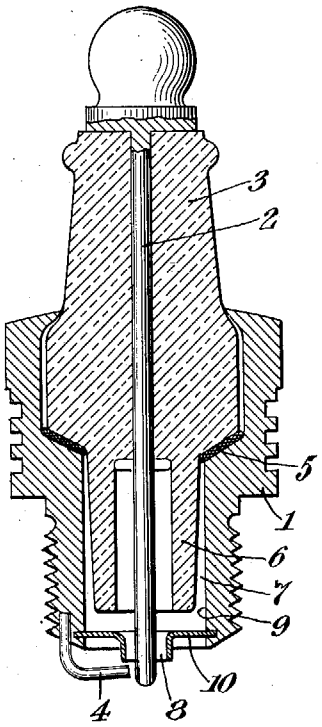

G. R. BLODGETT, R. T. HURLEY, AND M. E. CHENEY.

SPARK PLUG.

APPLICATION FILED JAN. 5, 1922.

Reissued Mar. 14, 1922. 15,303.

3 SHEETS—SHEET 1.

INVENTOR
George R. Blodgett
Moses E. Cheney
Roy T. Hurley

By their Attorneys Kenyon & Kenyon

G. R. BLODGETT, R. T. HURLEY, AND M. E. CHENEY.

SPARK PLUG.

APPLICATION FILED JAN. 5, 1922.

Reissued Mar. 14, 1922. 15,303.

3 SHEETS—SHEET 2.

INVENTOR
George R. Blodgett
Moses E. Cheney
Roy T. Hurley

By their Attorneys Kenyon & Kenyon

G. R. BLODGETT, R. T. HURLEY, AND M. E. CHENEY.

SPARK PLUG.

APPLICATION FILED JAN. 5, 1922.

Reissued Mar. 14, 1922. 15,303.

3 SHEETS—SHEET 3.

INVENTOR
George R. Blodgett
Moses E. Cheney
Roy T. Hurley
By their Attorneys · Kenyon & Kenyon

UNITED STATES PATENT OFFICE.

GEORGE R. BLODGETT, OF BROOKLYN, ROY T. HURLEY, OF NEW YORK, AND MOSES E. CHENEY, OF BROOKLYN, NEW YORK.

SPARK PLUG.

15,303. Specification of Reissued Letters Patent. Reissued Mar. 14, 1922.

Original No. 1,399,376, dated December 6, 1921, Serial No. 509,482, filed October 22, 1921. Application for reissue filed January 5, 1922. Serial No. 527,170.

*To all whom it may concern:*

Be it known that we, GEORGE R. BLODGETT, ROY T. HURLEY, and MOSES E. CHENEY, citizens of the United States, the said BLODGETT and CHENEY residents of Brooklyn, county of Kings, and State of New York, and the said HURLEY, a resident of Bronx, county of Bronx, and State of New York, have invented new and useful Improvements in Spark Plugs, of which the following is a specification.

Our invention relates to improvements in spark plugs. It has for its object to bring about the production of spark plugs better adapted for the particular uses to which they are to be put and to produce spark plugs more efficient and durable and less liable to carbonization and pre-ignition in use than has heretofore been possible. It consists of the novel devices herein set forth.

Heretofore many attempts have been made to overcome the troubles of carbonization and pre-ignition so frequent in the use of spark plugs. But so far none of these attempts have been entirely satisfactory or successful in overcoming the troubles. While many expedients have been suggested, more or less successful under certain specified conditions, none of them have resulted in the production of spark plugs uniformly and durably free from these troubles.

We have discovered that there is a close relationship existing between the volume of the space within the spark plug surrounding the electrode and adjacent parts, into which space the gas flows from the cylinder and in which it is burnt, the area of the walls of such space effective to receive, maintain and dispense heat, the manner and extent of admission of gas into the space, and the compression ratio of the engine cylinder with which the spark plug is to be used, and that, if the proper arrangement and proportions are secured in the manufacture of the spark plugs in these factors or particulars, the resulting spark plugs produced will be well adapted for the particular uses to which they are intended to be put, will be more durable and will function better than ordinary spark plugs and that over a much wider range of compression ratios and under much greater changes in load conditions, will be freer from liability to carbonize or to pre-ignite and will generally give much more efficient and satisfactory results; the gas introduced into the space within the spark plug will be brought into the very best condition for combustion, and the parts of the spark plug with which the gas comes into contact will be under ordinary running conditions brought into and maintained within the proper limits of temperature to produce the best results, neither low enough to permit carbonization or high enough to cause pre-ignition. The gas itself will be brought into the most favorable condition, both as to compression and complete vaporization of the fuel, for complete combustion; thus securing the highest efficiency without leaving harmful products of combustion on the electrode, insulation or other parts.

We have found that in engine cylinders there are two general classes of compression ratio, one that, for convenience, we term "high compression", including engine cylinders such as are used for aviation purposes, where compression is relatively high and speed constant, and "low compression" ratio, as in engine cylinders adapted for automobiles and marine purposes, where the compression is lower and the speed variable. In this specification and claims we use the terms "high" and "low" compression ratio in this general sense.

Figure 2:
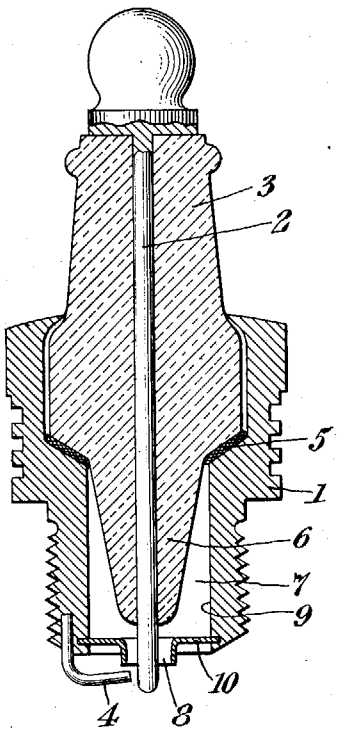
Figure 1:
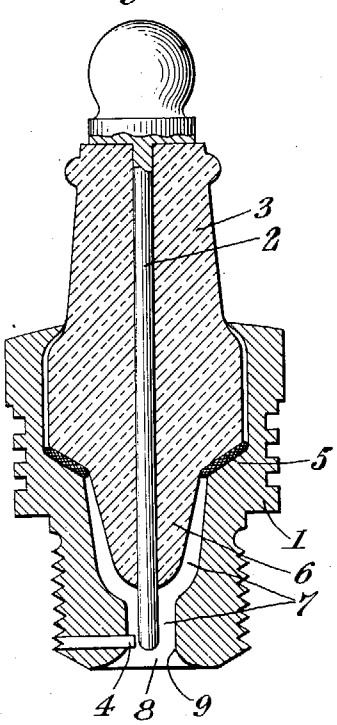
Figure 5:
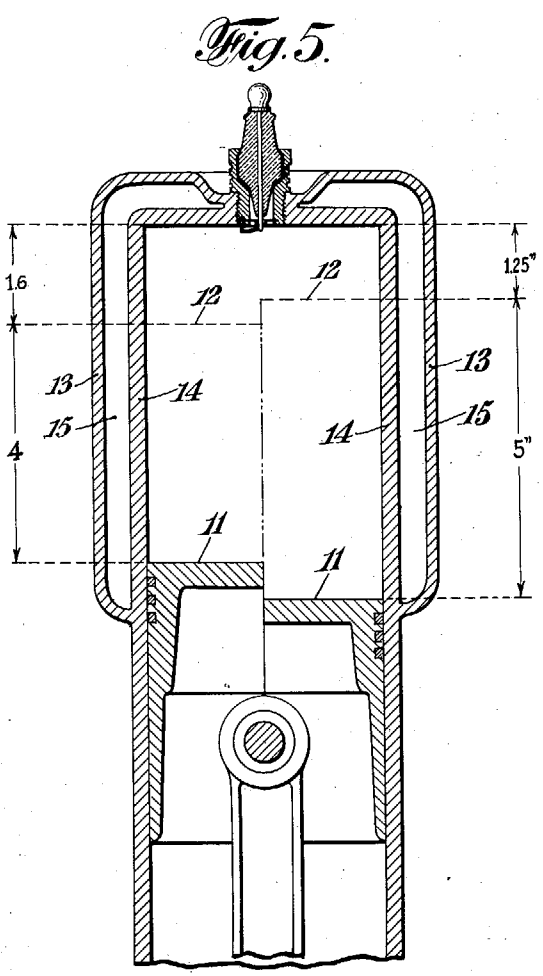
Figure 4:
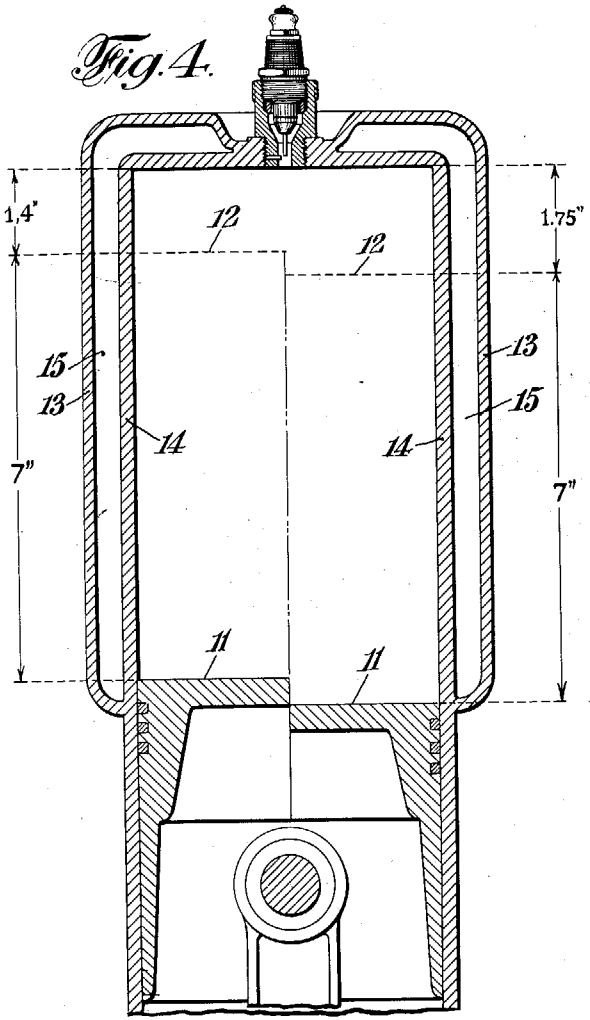
Figure 6:
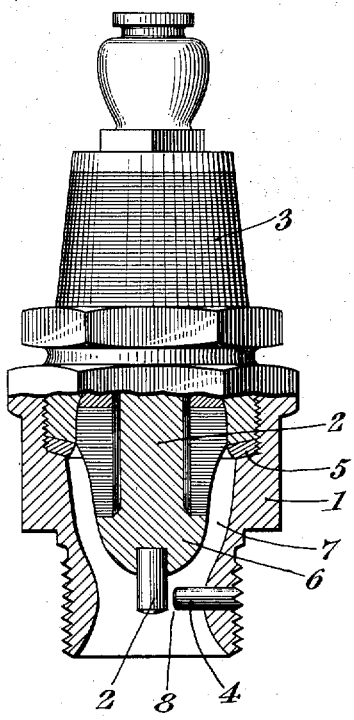
Figure 7:
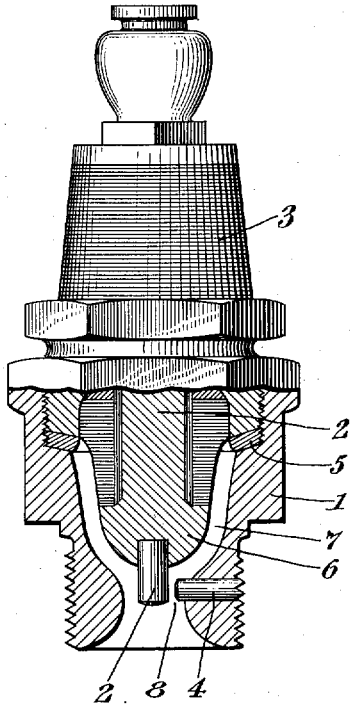

In the accompanying drawings forming part hereof, we have illustrated our improvement in its preferred forms for varying conditions. Referring to the drawings, Figure 1 represents a spark plug adapted for use with engine cylinders having a high compression ratio, such as are used for aviation purposes. Figs. 2 and 3 represent spark plugs adapted to be used with engine cylinders having low compression ratio, Fig. 2 illustrating one adapted to be used with engine cylinders for automobiles, and Fig. 3 for marine purposes. In each of these three figures, the view is a central vertical section through the greater part of the spark plugs. Fig. 4 represents a central section through an engine cylinder having a high compression ratio. Fig. 5 is a similar view for an engine cylinder having a low compression ratio, each figure showing a spark plug especially adapted for use with the engine cylinder with which it is connected. Figs. 6 and 7 represent spark plugs of a specific core and shell construction used for test purposes as hereinafter described.

Referring to Fig. 1, 1 represents the shell of the spark plug, 2 a central electrode, 3 the insulation surrounding it, 4 the other electrode, and 5 a gasket between the insulation and the shell. All the parts of the spark plug are not shown in detail. 6 is a part of the insulation protruding downward toward the end of the central electrode 2. 7 in a space formed within the lower part of shell 1, the walls of the space consisting of the interior surfaces of shell 1 and the exterior surfaces of the lower part of electrode 2 and of protruding portion 6 of the insulation. This space is of course filled with gas at each operation of the engine cylinder, which gas is exploded at the proper time during such operation. We have discovered that this space and the area of the surface of its surrounding walls effective to receive, maintain and dispense heat, and the cross-sectional area of the orifice 8, should be proportioned and arranged with reference to the compression ratio adapted to be developed under ordinary running conditions in the engine cylinder with which the spark plug is adapted to be used, and when the proper relationship of the volume of such space, and the effective heat area of the surrounding walls and the cross-sectional area of the orifice to one another and to the said compression ratio is obtained, the electrode and its adjacent parts, and the walls of the shell, will under ordinary running conditions be kept within a proper range of temperature, properly to condition the gas for the most complete combustion possible at the proper moment, i. e., to bring it to and maintain it within the proper limits of temperature, on the one hand above the carbonization point, i. e., not low enough to permit carbonization, and on the other hand below the pre-ignition point, i. e., not high enough to cause pre-ignition. In general, the volume of such space and the effective heat area of its surrounding walls should be decreased as the compression ratio increases and increased as that ratio decreases, although the rate of such decrease or increase is not exactly proportioned to the rate of increase or decrease in the compression ratio.

Generally speaking, the orifice should be more or less restricted, depending upon the compression ratio. In general, as the compression ratio becomes higher, the orifice should become larger in cross-sectional area, although this does not exactly vary in direct proportion to the rise in compression ratio. In other words, speaking generally, if the compression ratio is high the area of the orifice should be larger and if the compression is lower the cross-sectional area of the orifice should be less.

The area of the walls of the space, referred to herein as "effective area" or "effective heat area," refers not to the total actual physical surface as merely measured in square centimeters but to the total of the heating capacity of those walls. These walls in spark plugs are composed of a number of different substances, such as the inside walls of the shell of metal, the exterior walls of the spindle and electrode usually of a different metal, the exterior walls of insulating material, which may vary in different plugs, etc. These substances have different heat capacity conductivity, etc., and during normal running conditions one part will run hotter than another part, for example, and thus impart more heat to the unexploded gas in the space. There are thus two factors entering into the effective heating work done by these different parts of the walls of the space, one the actual physical area of a part and the other the relative capacity of the part to absorb, hold and give out heat to such gas. Manifestly the total of effective heating work or capacity therefor in the walls is the sum of the products of the areas of actual physical surfaces by the said relative heating capacity of each surface, such capacity being the ratio of the actual temperature of the said surface under normal running conditions to the temperature required to condition fuel i. e. the temperature just below that of the pre-ignition point. This for conciseness we term the "effective area" or "effective heat area" and each of the terms is used with this meaning throughout the specification and claims. The actual temperature of any of the parts under normal running conditions can be ascertained in any of the ways known to those skilled in the art, such as by the use of sentinel salts or pyrometers. To give an illustration of the method of computing the effective area of any part such as the surface of the central electrode, we will assume that the actual physical surface of the electrode in any particular case is one square centimeter. The actual temperature under normal running conditions of the surface of the electrode is determined to be 1900° F. absolute and the temperature required to condition the fuel in this particular case is 1135° F. absolute, then the effective heating surface of the electrode would be the product of its area 1 by the ratio of $\frac{1900}{1135}$ which is 1.67+ square centimeters. The effective area of each of the other parts is computed in the same way.

Figs. 2 and 3 illustrate spark plugs adapted to be used with engine cylinders of a relatively low degree of compression ratio. The spark plug of Fig. 2 is adapted to be used with engine cylinders of automobiles, and that of Fig. 3 with engine cylinders of marine engines, in which the compression ratio is still lower than that of engine cylinders adapted for automobile use. The corresponding parts of the spark plugs of Figs. 2 and 3 are numbered to correspond with similar parts of the spark plug of Fig. 1. In Fig. 2 it will be noted that the space 7 is larger or has a larger volume than that in Fig. 1, and the space 7 of Fig. 3 a still larger volume, and the surface area of the parts constituting the walls of the space in Fig. 2 is larger than that of the corresponding parts in Fig. 1, and in Fig. 3 it is larger still. The orifice 8 of the spark plug of Fig. 2 has a cross-sectional area of less size than that of Fig. 1 and the orifice 8 of Fig. 3 a still less size, although these areas in Figs. 2 and 3 are closer to each other than either one is to that of Fig. 1. In Figs. 2 and 3, the restricted opening 8 in each case is shown as made by means of a cap 10 having a restricted circular central opening.

Fig. 4 is a central section through an engine cylinder having a relatively high compression ratio and represents an engine cylinder such as the spark plug of Fig. 1 is adapted to be used with. At its upper end it is shown connected to a spark plug similar to Fig. 1. Fig. 4 is drawn diagrammatically to represent the range of displacement and corresponding compression ratios in high ratio compression cylinders. For this purpose the left half of the figure represents substantially about the highest limit of displacement or ratio of compression, and the right hand part of the figure represents about the lowest limit of displacement and the lowest limit of compression ratio in high compression cylinders, as defined herein. In each half 11 represents the lower end in each case of the cylinder and the distance between that in each instance and the dotted line 12 represents the length of stroke of the piston, and the distance from the dotted lines to the upper end of the cylinder represents in each instance the compression chamber of the cylinder. In each case the stroke is seven inches. In the left hand half the compression chamber is 1.4 inches in length and in the right hand half it is 1.75 inches in length. 13 represents the outer walls of the cylinder, 14 the inner walls, and 15 an intervening space for a cooling fluid. The other parts of the cylinder and its connections are not shown in detail, being of any ordinary construction and forming no part of our invention.

Fig. 5 similarly represents a vertical section through an engine cylinder of low compression ratio, as defined herein, and adapted to be used with a spark plug for automobiles or marine engines such as shown in Figs. 2 or 3. In this view similar parts are correspondingly marked to those of Fig. 4. The left hand side of the cylinder of Fig. 5 represents a length of stroke of piston of 4 inches and a compression chamber of 1.6 inches in length, forming substantially about the lower limit of compression ratio used in this class, one with which the spark plug of Fig. 3 is adapted to be used. The right hand end illustrates an engine cylinder in which the piston has a stroke of 5 inches and the compression chamber a length of 1.25 inches, and represents substantially about the upper limit of compression ratio in this class. It shows more particularly an engine cylinder with which the spark plug of Fig. 2 is adapted to be used.

While the limits of compression ratio and corresponding limits of volume of the space surrounding the electrode and adjacent parts and of the effective area of the surface of the walls of said space cannot be stated exactly for the different classes of compression cylinders, we have found that under ordinary running conditions they are about as follows: For high compression engines, namely, those in which the compression ratio under ordinary running conditions will range higher than about 5 to 1 and will generally range from about 5 to 1 to 6½ to 1, the volume of the space should range from about 1.25 cubic centimeters to about .50 cubic centimeters, and the effective area of the surface of the walls of the space should range from about 15 square centimeters to about 3 square centimeters; in low compression engines or those in which the limits of the compression ratio under ordinary running conditions will range below about 5 to 1 and generally from about 3 to 1 to 5 to 1, the volume of the space of the spark plug should vary from about 1.75 cubic centimeters to about 1.25 cubic centimeters and the surface of the walls of said space from an area of about 36 square centimeters to about 13 square centimeters.

Restriction of the orifice and especially in proper relationship to the other factors referred to above, assists in securing the proper amount of gas in the spark plug on each operation and in bringing that gas to the proper temperature and condition for explosion. Where an opening to a spark plug is unrestricted there are apt to be devious currents interferring with bringing the gas into proper condition for explosion, while with a restricted opening there is a positive swirling flow inward before explosion and outward after explosion, and the fuel fluid is more thoroughly brought into contact with the walls of the space inside of the plug, tending to bring it into proper condition.

The restriction of the orifice tends also to separate the space inside of the spark plug from the space inside of the cylinder more than would otherwise be the case, thus preventing too great and sudden rushes from the cylinder of cold gas before explosion and of intensely heated gas after explosion, and also permitting the gas within the space in the spark plug to be brought into better condition for combustion than is possible with the gas in the cylinder generally.

In high compression engines where the compression ratio varies as above stated, the cross-sectional area of the orifice should vary from about 0.20 square centimeters to about 1.0 square centimeters. In low compression engines within the limits of compression ratio above stated, we have found that the cross-sectional area of the orifice should vary from about 0.10 square centimeters to about 0.20 square centimeters.

One application of our improvement is to take any specific core and shell construction of spark plug, meaning by that a special arrangement, form, shape, size, etc., of central spindle, surrounding insulation, central electrode and surrounding shell, etc., and vary or adapt the orifice to cause such spark plug to become fitted for use with any desired compression ratio of engine cylinder, or to adapt it so that it will cover a wide range of compression ratios. While this can be carried out under the general principles laid down above, we have discovered that the best cross-sectional area of orifice in such instances cited can be derived from the following formula, namely $O=Kr^n$, in which O represents the cross-sectional area of the orifice, $r$ the compression ratio of the cylinder, and in which K and $n$ are constants of the particular core and shell construction. The value of the constants K and $n$ for any particular core and shell construction can be determined by taking two spark plugs of the same core and shell construction except that the orifices in the two cases will vary. The two plugs are then tested upon cylinders of different compression ratios until in each case the compression ratio is determined with which the spark plug gives best results. Such tests are well known to those skilled in the art and need not be described in detail except to say that in making such tests the highest compression ratio in each case is determined with which the spark plug will function without preignition and that compression ratio is taken as that at which, under normal running conditions, the spark plug gives the best results. The phrase "gives best results" is used throughout the specification and claims with this meaning. For example, in Figs. 6 and 7, we have illustrated a spark plug having the same core and shell construction but with varying orifices, that of Fig. 6 having a cross-sectional area of orifice of .82 square centimeters and that of Fig. 7 a cross-sectional area of orifice of .215 square centimeters. The two plugs also differ slightly in some other dimensions, which do not, however, prevent them from being of the same general core and shell construction. In Fig. 6, the inside diameter of the shell is seven-sixteenths of an inch and in Fig. 7 one-quarter of an inch, and the side electrode of Fig. 6 is .086 in diameter and has a length of .1212 inches, while that of Fig. 7 has the same diameter but a length of .0375. The central electrode has a diameter of .125 inches in each plug. It was found in the tests that the spark plug of Fig. 6 was best adapted for use with a compression ratio of 6.5 to 1, while the spark plug of Fig. 7 was best adapted for use with a compression ratio of 5 to 1.

With the above specific examples of the core and shell construction in question, the values of K and $n$ are derived from the above formula, as follows: the formula representing the plug of Fig. 6 is $O=Kr^n$, and that representing the plug of Fig. 7 is $O_1=Kr_1^n$. From these two equations the values of K and $n$ are derived as follows: In the first, $$K=\frac{O}{r^n},$$

and in the second case $$K=\frac{O_1}{r_1^n}$$

Therefore, $$\frac{O}{r^n}=\frac{O_1}{r_1^n}$$

Multiplying by $$\frac{r^n}{O_1},$$

we get $$\frac{O}{O_1}=\frac{r^n}{r_1^n}$$

$$\left(\frac{r}{r_1}\right)^n=\frac{O}{O_1}$$

$$n\ \mathrm{Log}_{\cdot 10}\frac{r}{r_1}=\mathrm{Log}_{\cdot 10}\frac{O}{O_1}$$

$$n=\frac{\mathrm{Log}_{\cdot 10}\frac{O}{O_1}}{\mathrm{Log}_{\cdot 10}\frac{r}{r_1}}$$

Substituting values of O, $O_1$, $r$ and $r_1$.

$$n=\frac{\text{Log.}\frac{.82}{.215}}{\text{Log.}\frac{6.5}{5}}=\frac{\text{Log. }3.813}{\text{Log. }1.3}=\frac{.581267}{.113943}=5.1$$

$$n=5.1$$

Substituting value of $n$ in equation $K=\frac{O}{r^n}$ above—

$$K=\frac{.82}{6.5^{5.1}}=\frac{.82}{13990}=.0000585$$

$$K=.0000585$$

The values of all the factors now being known, the value of O can be determined in the original formula, $O=Kr^n$.

As a specific example, if it was desired to determine the O most suitable for use with the compression ratio 6 to 1, with the same core and shell construction, it would be done as follows:

$O=Kr^n$.

$O=.0000585\times 6^{5.1}$ $O=.0000585\times .9302=.545$ $O=.545$ sq. cm.

This cross-sectional area is net cross-sectional area and of course allowance should be made because of the central and side electrodes. When the cross-section of the central electrode and the projected surface of the side electrode are added to the net, the gross area becomes .655 square centimeters, requiring a diameter of orifice of .913 centimeters, or approximately .359 inches.

Our improved spark plugs are durable, efficient, not liable to carbonization or preignition in use even over a wide range of compression ratios and load conditions.

What we claim as new and desire to obtain by Letters Patent is:

1. In a spark plug adapted for use in connection with cylinders of internal combustion engines having a compression ratio higher than 5 to 1, the combination of an electrode and a shell provided with a space, to be filled with gas from the cylinder, surrounding the electrode and adjacent parts, and a restricted orifice adapted to connect the space with the cylinder of an engine, the relative proportions of the volume of the space within the spark plug and the effective area of surface of the walls of said space and the cross-sectional area of the orifice to one another being substantially as follows: the volume of said space being within about 1.25 cubic centimeters to about .50 cubic centimeters, the effective area of surface of the walls of said space being within about 13. square centimeters to about 3. square centimeters, and the cross-sectional area of the orifice being within about 0.20 square centimeters to about 1.0 square centimeters.

2. The combination of a cylinder of an internal combustion engine having a high compression ratio, a spark plug fitted into a wall of the cylinder, having an electrode and a shell provided with a space, to be filled with gas from the cylinder, surrounding the electrode and adjacent parts, and a restricted orifice adapted to connect the space with the cylinder, the relative proportions of the volume of the space within the spark plug and the effective area of surface of the walls of said space and the cross-sectional area of the orifice to one another being substantially as follows: the volume of said space being within about 1.25 cubic centimeters to about .50 cubic centimeters, the effective area of the surface of the walls of said space being within about 13. square centimeters to about 3. square centimeters, and the cross-sectional area of the orifice being within about 0.20 square centimeters to about 1.0 square centimeters.

3. In a spark plug adapted for use with a specific compression ratio or range of compression ratios of cylinder of internal combustion engines, the combination of a specific core and shell construction containing a space around the electrode and adjacent parts of a specific volume and having a specific effective area of surface for the walls of said space, and a restricted orifice for said space of a cross-sectional area of the value of O in the formula $O=Kr^n$, where K and $n$ are constants dependent upon the said construction of core and shell, and are determinable from two spark plugs of the said construction of core and shell but differing from each other in cross-sectional area of orifice, when each spark plug is used with the compression ratio adapted to give the best results for said spark plug.

4. The combination of a cylinder of an internal combustion engine of a specific compression ratio, a spark plug fitted into the walls of said cylinder, and having a specific construction of core and shell containing a space around the electrode and adjacent parts of a specific volume, and having a specific effective area of surface for the walls of said space, and a restricted orifice to the spark plug of a cross-sectional area of the value of O in the formula $O=Kr^n$, where K and $n$ are constants, dependent upon the said construction of core and shell and are determinable from two spark plugs of the said construction of core and shell but differing from each other in cross-sectional area of orifice, when each spark plug is used with the compression ratio of cylinder adapted to give the best results from said spark plug.

5. The combination of a cylinder of an internal combustion engine having a high compression ratio, a spark plug fitted into a wall of the cylinder, having an electrode and a shell provided with a space, to be filled with gas from the cylinder, surrounding the electrode and adjacent parts, and a restricted orifice adapted to connect the space with the cylinder, the relative proportions of the volume of the space within the spark plug and the effective area of surface of the walls of said space and the cross-sectional area of the orifice to one another being substantially as follows: the volume of said space being within about 1.25 cubic centimeters to about .50 cubic centimeters, the effective area of the surface of the walls of said space being within about 15. square centimeters to about 3. square centimeters, and the cross-sectional area of the orifice being within about 0.20 square centimeters to about 1.0 square centimeters.

In testimony whereof we have signed our names to this specification.

GEORGE R. BLODGETT.
ROY T. HURLEY.
MOSES E. CHENEY.